Feb. 11, 1969

S. J. LEBEL ET AL 3,426,579

CONTINUOUS MONITOR FOR THE RAPID DETECTION
OF HYDROGEN AND OXYGEN

Filed Sept. 3, 1965

INVENTOR.
STEPHEN J. LEBEL
BY WILLIAM E. STROBELT

ATTORNEY

United States Patent Office 3,426,579
Patented Feb. 11, 1969

3,426,579
CONTINUOUS MONITOR FOR THE RAPID DETECTION OF HYDROGEN AND OXYGEN
Stephen J. Lebel and William E. Strobelt, Seattle, Wash., assignors to The Boeing Company, Seattle, Wash., a corporation of Delaware
Filed Sept. 3, 1965, Ser. No. 484,962
U.S. Cl. 73—23
Int. Cl. G01n 31/04
4 Claims

ABSTRACT OF THE DISCLOSURE

The invention is addressed to a method and apparatus for the qualitative and quantitative analysis of a fluid or gas, in particular, those containing hydrogen and oxygen. The fluid is impinged on a heated palladium-alloy barrier in a chamber which has been activated by hydrogen formed by an electrolysis cell. The other side of the chamber is continuously pumped by a vacuum ion pump. The hydrogen permeating the palladium-alloy barrier creates a pressure change which is detected by a change in the current supplied to the ion pump and a detector unit. A further feature resides in an oxygen scrubber placed between the barrier and the fluid source to remove oxygen from the fluid. Another important feature is the use of two analyzers, one of which has no oxygen scrubber, whereby the difference in current represents the amount of oxygen present in the fluid or gas.

---

This invention relates to an improved method and apparatus for the analysis of a fluid or gas, and more particularly to an improved method and apparatus employable for the detection and the quantitative measurement of the concentrations of hydrogen and/or oxygen present in a mixture of other gases, and more particularly an improved method and apparatus employable for the detection and quantitative measurement of rapid variation in the concentrations of hydrogen and/or oxygen present in a mixture of gases.

Advances in scientific knowledge have been compiled by various classifications of technology and increased needs have arisen for improved analytical techniques including qualitative and quantitative detection of components in a gaseous mixture. More particularly, a need has existed to quantitatively determine in precise fashion the presence of hydrogen and/or oxygen in extremely low concentrations in a gaseous mixture. There are many industrial processes where the low concentration of hydrogen or oxygen, such as concentrations of one part per million, must be monitored with great accuracy and other industrial processes where hydrogen and/or oxygen must be monitored in a mixed gas stream where the hydrogen and/or oxygen is present in concentrations varying from one part per million to 100% by volume in a period less than five seconds. In the past the technological knowledge and predictability of phenomena in various technical disciplines have lagged in their development since there have been no convenient means of measuring such concentrations and changes of hydrogen and oxygen present in a gaseous mixture in a short span of time.

Arc welding can be taken as one technical discipline in which knowledge of phenomena occurring is greatly limited by analytical techniques in relation to the various atmospheres over the work pieces being subjected to arc welding processes. In times past the materials which were subjected to arc welding were relatively low-strength materials which would not be very adversely affected by the small amounts of gaseous impurities introduced into the weld joining various segments of low-strength material. Today, however, technology has created new materials possessing higher strength in general, higher strength at elevated temperatures, and improved ductility and other properties. These more desirable properties are directly related to the amount of impurities and foreign contaminants which are present in the material. Thus, as material technology has improved, welding technology also had to undergo changes in order to compete with other bonding techniques. Since a low-cost, relatively easy method of joining materials, such as welding, could be replaced only by more costly bonding techniques, it is apparent that cost limitations in the use of the new high-strength materials would be encountered. In arc welding processes, the arc shielding media for inert gas shielded nonconsummable electrode are welding operations requires a careful and continuous monitoring of the hydrogen and oxygen levels present in the inert gas. The hydrogen and oxygen contaminants must be detected rapidly so as to control the levels of these contaminants to insure the highest reliability in weldments.

When it is realized that the analysis of hydrogen in furnace atmospheres by gas chromatography is currently performed in two steps: (1) analysis of all other components in the atmosphere accomplished by using helium as a carrier gas; (2) analysis of hydrogen is then accomplished using either nitrogen or argon gas as a carrier gas, it is obvious that present systems including the one mentioned for analyzing hydrogen in a gaseous atmosphere must be improved in order to rapidly detect the minute variations in the concentration of the hydrogen component. According to the teachings of the instant invention, response to hydrogen as well as all other components can be accomplished in one step using helium as a carrier gas. The compact, light-weight, portable, rapid response and high sensitivity as well as the low cost features of the instant invention display an attractive and promising market in the gas chromatography industry. The instant invention can be used in tandem with conventional gas chromatographic detectors such as the thermal conductivity cell or electron capture detector.

It is an object of this invention to achieve a method and an apparatus for determining the instantaneous rate of change of minute concentrations of hydrogen and/or oxygen in a gaseous mixture.

Another object of this invention is to achieve an apparatus for the instantaneous determinations of minute concentrations of hydrogen and oxygen wherein the apparatus is embodied in a small compact unit capable of integration into many existing systems.

It is another object of the instant invention to achieve an apparatus for detecting changes in minute concentrations of hydrogen and oxygen in a gaseous mixture wherein said apparatus is easily rejuvenated.

A fourth object of the instant invention is to have an apparatus and method of measuring changes and minute concentrations of hydrogen and oxygen in a gaseous atmosphere wherein said method and apparatus can be utilized with initial low-cost outlay, low cost of operation and low cost of maintenance and rejuvenation.

An additional object of the instant invention is to achieve means for rapidly correlating the change in the partial pressure of hydrogen and oxygen in a gaseous mixture.

A sixth object of the instant invention is to provide an analyzer for rapid changes of hydrogen and oxygen concentrations in a gaseous mixture wherein said analyzer will have a long operating life and avoid polarization effects, thus enabling long periods of operation.

It is another object of the instant invention to achieve an apparatus for detecting wide ranges of hydrogen and oxygen concentrations in a gaseous mixture.

Still another object of this invention is to provide a compact, light-weight, portable, rapid response and high sensitivity instrument for use in gas chromatography.

Other objects and applications of the instant invention will be immediately realized on consideration of the following specification, claims and the attached drawings wherein:

Figure 1:
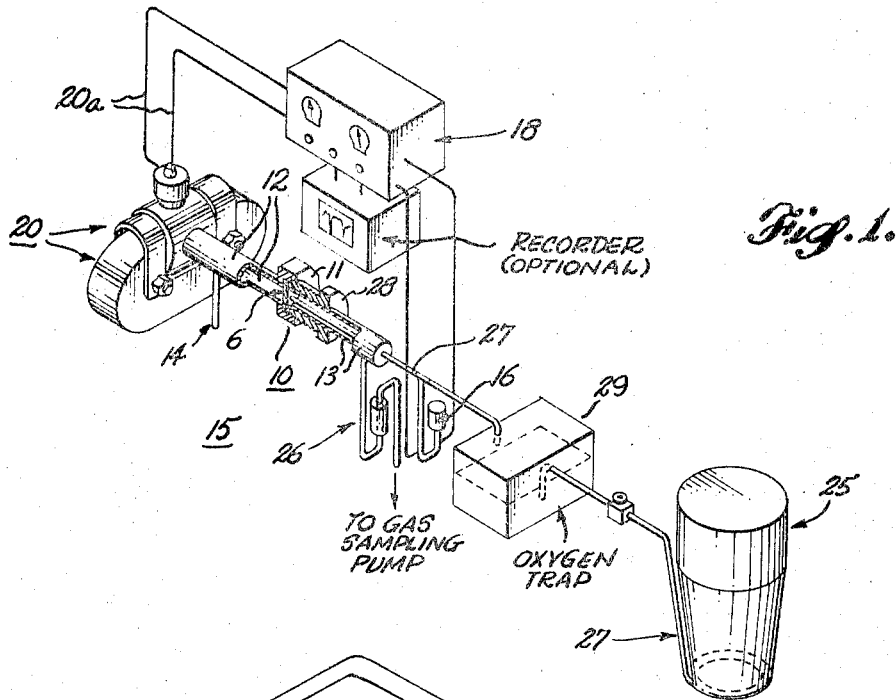
FIGURE 1 represents an inexpensive hydrogen analyzer having high sensitivity and instantaneous response as disclosed in the specification.

Hydrogen analysis according to this invention is accomplished by flowing a gas stream, containing a hydrogen component to be analyzed, at a predetermined substantially constant rate of flow against a permeable barrier specific for hydrogen only. The subject invention incorporates the use of heated palladium or palladium alloys (palladium-silver or palladium-gold), mildsteel, nickel, manganese alloy foils having small cross-sectional areas as the barrier specific for hydrogen only. The subject invention may also incorporate the use of a thin non-metallic membrane (glass or ceramic) having small cross-sectional areas as the barrier specific for hydrogen only.

The hydrogen specific barrier separates two distinct chambers: a first chamber on the side of the barrier at which the flowing gas impinges is maintained at atmospheric pressure; a second chamber is separated from the first as noted above and is maintained at an ultra-high vacuum (i.e., pressures of $1 \times 10^{-8}$ torr or less). As the gas stream impinges upon the hydrogen permeable barrier, any hydrogen present as part of the gas stream will diffuse through the barrier and into the low pressure chamber, thereby increasing the pressure therein. The low pressure chamber is continuously pumped with an electronic ion pump which draws current as a linear function of the absolute pressure within the chamber. Thus continuous pumping of the low pressure or analyzer chamber of the subject invention senses the amount of hydrogen permeating through the barrier in terms of partial pressure of hydrogen. Since the total pressure of the gas stream is known, the hydrogen concentration therein is readily obtainable. A second feature of the subject invention is the idea of activation of the diffusion barrier (palladium alloys) by the addition of hydrogen activator gas from a separate container (a small electrolysis cell forming hydrogen by electrolytic decomposition). Activation of the diffusion barrier provides extremely rapid diffusion of the hydrogen through the barrier.

The prior art in general relates to hydrogen permeation cells having palladium barriers but none of the commercial instruments available today teach the use of an ion pump gas detector system in combination with means for activation of the diffusion barrier. For example, the patent to Fearon, No. 2,499,020, discloses in a gas analyzer the concept of continuously evacuating by means of a vacuum pump a diffusion zone into which are passed limited quantities of a gas to be analyzed. The diffusion zone is provided with an ion gauge for analysis purposes. The patent to Hunter et al., No. 2,961,062, discloses in a hydrogen permeating cell the concept of incorporating barrier means of a material such as palladium which may be heated. The patents to Hulsberg, Nos. 2,671,336 and 2,671,337, also teach in a hydrogen gas analyzer the utilization of palladium as a barrier medium specific therefor. As noted earlier, however, while these prior art references in general relate to hydrogen permeation cells having palladium barriers, they do not teach the idea of activation of the diffusion barrier so as to acquire the extremely fast response time and high sensitivity which is characteristic of the teachings of the subject invention.

Referring to FIG. 1, a more detailed understanding of the instant invention can be gained. A rapid response hydrogen analyzer 15 is depicted attached to an inert gas shielding cup 25 characteristic of mechanized or hand welding torches. The hydrogen analyzer 15 comprises: an electrically heated diffusion barrier unit 10 interconnected with a low pressure chamber 12, a conduit 27, and a combination ion pump and detector unit 20. Conduit 27 conveying gas to be analyzed for hydrogen content from cup 25 to unit 10 is terminable within unit 10 at the diffusion barrier 6. Continuous pumping action to reduce the pressure within the chamber 12 of the unit 10 is initiated by a rotary vane pump and/or a heated liquid diffusion pump (not shown) which evacuates chamber 12 through conduit 14. Conduit 14 is then sealed off by any of the well known methods when low pressure has been achieved. Subsequent pumping of chamber 12 is continuously maintained by a sputtered metal high-voltage pump, as designated by the lower reference arrow of numeral 20, such as a vacuum ion pump. A gas sample pump (not shown) pumps gas or fluid away from a first chamber 13 of the diffusion barrier unit 10 through a conduit 26.

The diffusion barrier unit 10 includes a heater wire (not shown) for the barrier 6, disposed in the form of coils about a portion of the unit 10. The palladium-alloy barrier 6 is disposed within unit 10 and fixed therein by any convenient mechanical support (to be described below) so that gas flowing through gas sampling conduit 27 and impinging upon barrier 6 must either diffuse therethrough into chamber 12 or be pumped away from unit 10 through conduit 26 which connects with the first chamber 13. As seen in FIG. 1, barrier 6 separates chamber 12 from the first chamber 13. Since the palladium barrier 6 is selective for diffusion of hydrogen only, hydrogen will pass through the barrier 6 and into chamber 12 thereby creating a measurable pressure change within chamber 12 which is detected by the combination ion pump and detector unit 20 as will be described below.

Continuing with reference to FIG. 1, an activation cell 16 is shown connected to gas sampling conduit 27. Cell 16 is connected by leads to a control unit and readout center 18 which serves in part to monitor the partial pressure of the activation gas within cell 16 in terms of amperage, to thereby provide an accurate accounting of the presence of hydrogen coming from cell 16 as distinguished from the amount of hydrogen present in the gas from source 25. Cell 16 is disposed to provide activation of the diffusion barrier 6 by the addition of hydrogen activator gas along conduit 27 thereto. The small electrolysis cell 16 forms hydrogen by electrolytic decomposition of aqueous sulfuric acid solution, for example. This method of activating the surface of the diffusion barrier 6 is one of the main reasons (as will be explained below) for the fast response time and high sensitivity of this invention to detect hydrogen to one part per million. The control unit and readout center 18 is formed in part by any of the commercial meters available, for example an ammeter.

A cylindrical fitting 11 is shown disposed about the chamber 12. Fitting 11 is conveniently made from any high-strength material, such as stainless steel. The fitting 11 supports the palladium alloy foil barrier 6. Fitting 11 receives a threaded member 28 which supports means defining chamber 13 and conduit 27 which is disposed in any convenient manner within chamber 13. The combination ion pump and detector unit 20 is shown connected by leads 20a or any convenient circuitry to the control unit and readout center 18. Any increase in pressure within chamber 12 due to hydrogen which diffuses across barrier 6 is immediately detected by the combination ion pump and detector unit 20 in terms of the power required to restore the partial vacuum within the chamber 12. The control unit and readout center 18 interpolates (by appropriate indicators not shown) the power reading in terms of partial pressure of hydrogen.

Figure 2:
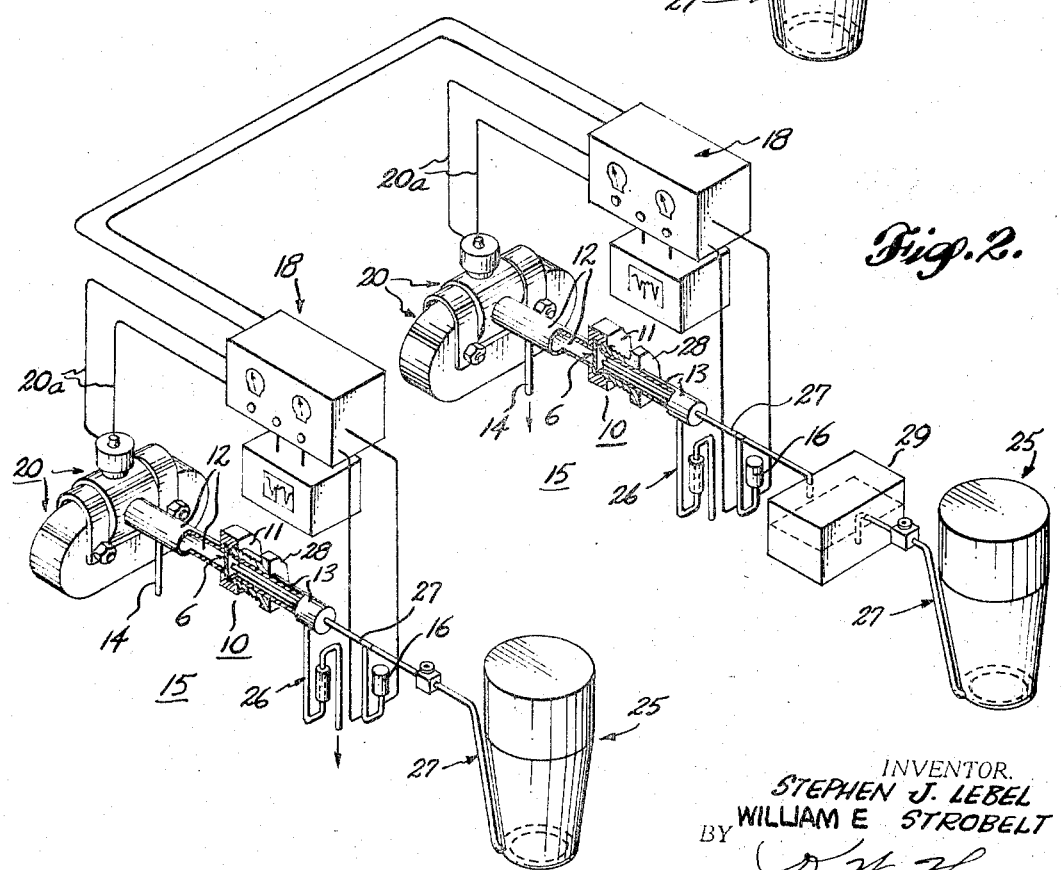
FIGURE 2 represents two of the analyzers of FIGURE 1 disposed in parallel and in combination by appropriate circuitry.

In the detection analysis of a gas or fluid for the presence of hydrogen, an additional problem often exists. Detection of hydrogen in the presence of oxygen, where the oxygen concentration is greater than one-half a percent (by volume) of the hydrogen concentration, must be conducted by first passing the gas or fluid through an oxygen trap or scrubber solution 29, as seen in FIGURES 1 and 2. The reason for this procedure is found in the tendency of oxygen to react chemically with hydrogen in the presence of a hot metal surface (such as the hot palladium barrier 6) to form water:

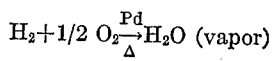

Consumption of hydrogen by the above oxidation reaction will lead to low and erroneous readings at the control unit and readout center 18. Unless the oxygen is removed by a scrubber 29, the accurate representation of hydrogen concentration in the gas or fluid will be impossible.

The incorporation of the scrubber 29 provides a further feature of this invention as seen with reference to FIG. 2.

With reference to FIG. 2, two hydrogen analyzers are disposed in parallel relationship and interconnected by appropriate circuitry. One of the analyzers only contains an oxygen scrubber 29. The gas or fluid stream to be analyzed is passed from a source (in this case a weld cup 25) through conduit 27. Because any oxygen present will be removed from one analyzer by scrubber 29, there will be a difference in hydrogen detector output between the two analyzers as recorded by the control unit and readout centers 18. The difference in output can be, by appropriate metering systems (not shown), represented as the amount of oxygen present in the gas or fluid stream. Another measure of oxygen concentration can be obtained through the use of the hydrogen activation cell 16. In the analyzer of FIG. 2 not having a scrubber 29, if hydrogen is added through the activation cell 16, equal readings or outputs can be maintained between the two detectors as shown at the control unit and readout center 18 or to null a bridge circuit (not shown) wherein each detector output comprises mutually opposing arms of that bridge. This method of analysis is similar to the titration of acid by a base in an analytical chemistry situation; i.e., by appropriate circuitry (not shown) the quantity of electricity required by the electrolytic hydrogen producing activation cell 16 to null the bridge will be equivalent to the oxygen present in the gas system coming from weld cup 25.

The chamber 12 is approximately five cubic inches in volume in the embodiments of FIGS. 1 and 2. The high-voltage pump 20 forms the ion pump and detector unit. The detector unit 20, more fully described below, is simply a means for measuring partial pressure of a gas as a function of current flow. With reference to the barrier unit 10 and high-voltage pump 20, use of the multicelled cold cathode ion pump, for example, enables the embodiment of a compact combination pumping source and pressure detection (readout unit) 20 mentioned above. All metal construction of the ion pump 20 permits bakeout to 450° C., with the result that very low residual pressures ($1 \times 10^{-10}$ torr) are possible; this feature permits sensing of very low changes in hydrogen pressure by the detector unit 20. In addition, the pumping of hydrogen gas by the ion pump 20 is more rapid than for any other gas: nearly 2 to 1 when compared to air, and 100 to 3 compared to argon. The barrier 6 is specific for hydrogen only as mentioned above. The barrier 6 comprises thin (e.g. 0.005 inch thickness) palladium or palladium alloys (palladium silver, palladium gold), mild steel, nickel or manganese alloy foils of small diameter (e.g. ¼ inch in diameter). The barrier 6 may also be formed by alternate non-metallic thin membranes (glass or ceramic) of small diameter (e.g. ¼ inch in diameter).

The barrier 6 prevents all gases or fluids within conduit 27, excepting hydrogen, from entering the high vacuum chamber 12.

A feature of this invention is the concept of using a miniature vacuum chamber 12 defined by fitting 11 and conduit 12 which is continuously pumped by an ion pump and detector unit 20, after initial pumping by a fore pump (not shown) through conduit 14. As noted above, the detectoru nit 20 operates on a basis of partial pressures. The over-all apparatus functions on the basis of the high permeability of hydrogen through palladium metal. Hydrogen combines with hot palladium on contact to form palladium hydride which opens the lattice of the metal to further permeation by hydrogen. The remainder of the gas within sampling conduit 27, not being specific for diffusion through palladium barrier 6, is removed by pump means (not shown) through conduit 26.

Diffusion of hydrogen through the metal barrier 6 is rapid; on the ultra-high vacuum side of the barrier 6 (chamber 12) the hydrogen is desorbed rapidly from the surface of barrier 6. The hydrogen which has been desorbed will increase the pressure within the chamber 12. The increased pressure causes a change in the amperage of the current supplied to the combination ion pump and detector unit 20. The change in amperage is continuously monitored by the control unit and readout center 18 which interpolates, as noted above, current flow in terms of pressure of hydrogen. The hydrogen is capable of detection in the above manner from either gaseous or liquid water environments which pass through conduit 27 to impinge upon barrier 6. Once the pressure of the hydrogen in the chamber 12 is determined, the temperature and pressure of the gas within conduit 27 as well as other known boundary conditions are used to calculate the concentration of the hydrogen in the particular medium, whether it be gas or liquid, in conduit 27.

It is to be noted with reference to FIGS. 1 and 2 that the diffusion barrier unit 10 is shown in combination with a weld cup 25 as a system for continuously monitoring the hydrogen and oxygen levels in the arc shielding media for inert gas shielded, non-consumable electrode arc welding operations. The arrangement of the conveyance of gas to unit 10 can be varied to meet the requirements of the particular system in which the hydrogen analyzer 15 is to be employed (i.e., to analyze fluid from any source).

Many advantages gained by using the instant invention may be set forth. The hydrogen analyzer 15 has the advantage of being able to detect changes in the concentration of hydrogen in a gaseous or liquid atmosphere in a matter of a fraction of a second. Such rapid analysis is due to the design, construction and configuration of the instant invention. It is submitted that the instant invention is one which will be able to keep up with the realistic changes of the increasing need for accurate and convenient monitoring of hydrogen concentrations occurring within most industrial processes. As well as being able to quantitatively and qualitatively detect the presence of hydrogen, the instant invention has the advantage of being able to give instantaneous readings through the readout center 18 as shown in FIG. 2 so as to enable one to monitor any industrial process which has rapid changes in the hydrogen and oxygen content of a liquid or gaseous media.

The instant invention also has the advantage of being a small, compact unit which is flexible in its design so as to enable the unit to be placed within whatever requirements are encountered in industrial processes. The instant invention combines the desirable features of initial low construction costs with the feature of low operating costs and a minimal cost of regeneration after long periods of operation. The system is relatively independent of most of the common industrial variations such as temperature and pressure. As seen with reference to FIGS. 1 and 2, the invention lends itself readily to utilization in monitoring a gaseous atmosphere generated during welding operations; the invention can as readily be deployed for use in other industrial applications requiring hydrogen and/or oxygen monitoring.

While we have described and illustrated some preferred forms and embodiments of our invention, it should be understood that many modifications may be made without departing from the scope and the spirit of the invention, and it should therefore be understood that the invention is limited only by the scope of the attached claims.

We claim:

1. Apparatus for the detection and quantitative measurement of hydrogen in a fluid of unknown composition comprising:
   (a) means defining a chamber including means specific for the permeation of hydrogen therethrough;
   (b) vacuum pump means including pressure sensitive means, in combination with said means defining a chamber;
   (c) activation cell means providing hydrogen to activate said means specific for the permeation of hydrogen therethrough; and
   (d) readout means, in combination with said pumping means and with said activation cell means, having circuitry to quantitatively interpret the output of said pressure sensitive means and to distinguish therefrom the output of said activation cell means, whereby said chamber is continuously pumped by said pumping means which draws current as a linear function of the absolute pressure within said chamber.

2. Apparatus for the detection and quantitative measurement of hydrogen in a fluid of unknown composition comprising:
   (a) means defining a first chamber including means specific for the permeation of hydrogen therethrough;
   (b) vacuum pump means including pressure sensitive means in combination with said means defining a first chamber whereby said first chamber is maintained at a high partial vacuum;
   (c) means defining a second chamber, said second chamber being disposed at said first chamber and separated therefrom by said means specific for the permeation of hydrogen therethrough;
   (d) conduit means connecting said second chamber and:
      (1) an activation cell providing hydrogen to activate said means specific for the permeation of hydrogen therethrough;
      (2) a source of unknown fluid which is to be monitored for the presence of hydrogen;
      (3) an oxygen trap to remove oxygen from the unknown fluid as the unknown fluid is passed from the source through said conduit means to said second chamber where said unknown fluid impinges upon said means specific for the permeation of hydrogen therethrough; and
   (e) readout means including circuit means to quantitatively interpret the output of said pressure sensitive means to provide a quantitative measurement of the amount of hydrogen permeating through said means specific for the permeation of hydrogen in terms of the current drawn by said pumping means which is a linear function of the absolute pressure within said first chamber.

3. In apparatus for the detection and quantitative measurement of oxygen in a fluid of unknown composition, the combination comprising, at least two hydrogen analyzers interconnected by circuit means, one of said two hydrogen analyzers having an oxygen trap means through which the unknown fluid flows, said oxygen trap means operative to remove oxygen from the fluid source flow, each of said hydrogen analyzers comprising:
   (a) means defining a chamber including means specific for the permeation of hydrogen therethrough;
   (b) vacuum pump means including pressure sensitive means in combination with said means defining a chamber;
   (c) an activation cell providing hydrogen to activate said means specific for the permeation of hydrogen therethrough;
   (d) readout means including said circuit means to quantitatively measure the output of each said pressure sensitive means, a common metering means to represent the difference in said quantitative measures from each analyzer, whereby said difference is quantitatively representative of the amount of oxygen in the fluid source.

4. The apparatus of claim 1 further comprising:
   (e) an oxygen trap means to remove oxygen from the fluid before it enters said means defining a chamber.

References Cited

UNITED STATES PATENTS 2,909,919  10/1959  Myer _____ 73—23

OTHER REFERENCES

The Review of Scientific Instruments, article "A Method for Detecting Hydrogen in Gas Mixtures" by J. R. Young et al., vol. 31, No. 10, October 1960, pp. 1112–14.

RICHARD C. QUEISSER, *Primary Examiner.*

C. J. McCLELLAND, *Assistant Examiner.*